United States Patent
Hatano et al.

(10) Patent No.: US 6,688,944 B2
(45) Date of Patent: Feb. 10, 2004

(54) SPECTACLE LENS CHAMFERING DATA PREPARING METHOD, SPECTACLE LENS CHAMFERING METHOD, SPECTACLE LENS CHAMFERING DATA PREPARING APPARATUS, AND SPECTACLE LENS CHAMFERING APPARATUS

(75) Inventors: Yoshiyuki Hatano, Tokyo (JP); Takahiro Watanabe, Tokyo (JP); Toshihiro Iwai, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 0 days.

(21) Appl. No.: 09/981,092

(22) Filed: Oct. 16, 2001

(65) Prior Publication Data

US 2002/0045403 A1 Apr. 18, 2002

(51) Int. Cl.[7] ................................ B24B 1/00
(52) U.S. Cl. ................ 451/5; 451/43; 451/41
(58) Field of Search ............... 451/5, 6, 43, 240, 451/255, 256, 277, 325, 384, 390, 42, 210; 350/177, 178, 246; 73/104, 105, 865.8, 865.9

(56) References Cited

U.S. PATENT DOCUMENTS

| 4,286,415 | A | | 9/1981 | Loreto |
| 5,775,973 | A | * | 7/1998 | Watanabe ................ 451/5 |
| 5,895,314 | A | * | 4/1999 | Kitao et al. ............. 451/43 |
| 5,934,972 | A | * | 8/1999 | Gottschald ............... 451/5 |
| 6,048,258 | A | * | 4/2000 | Shibata ................ 451/277 |
| 6,059,635 | A | * | 5/2000 | Mizuno ................... 451/5 |
| 6,089,957 | A | * | 7/2000 | Shibata ................. 451/41 |
| 6,095,896 | A | * | 8/2000 | Kobayashi ............... 451/5 |
| 6,099,383 | A | | 8/2000 | Mizuno et al. |
| 6,328,628 | B1 | * | 12/2001 | Mizuno et al. ........... 451/5 |
| 6,328,635 | B1 | * | 12/2001 | Suzuki et al. .......... 451/43 |
| 6,427,094 | B1 | * | 7/2002 | Mizuno ............... 700/159 |

FOREIGN PATENT DOCUMENTS

| EP | 0 510 462 A1 | 10/1992 | ........... B24B/9/14 |
| EP | 0 857 539 A2 | 8/1998 | ........... B24B/9/14 |
| EP | 0 857 540 A2 | 8/1998 | ........... B24B/9/14 |
| EP | 0 857 539 A3 | 3/1999 | ........... B24B/9/14 |
| EP | 0 857 540 A3 | 3/1999 | ........... B24B/9/14 |
| JP | 05-131350 | 5/1993 | ........... B24B/9/14 |
| JP | 10-225853 | 8/1998 | ........... B24B/9/14 |
| JP | 10-225854 | 8/1998 | ........... B24B/9/14 |
| JP | 10-225855 | 8/1998 | ........... B24B/9/14 |

\* cited by examiner

*Primary Examiner*—Lee D. Wilson
*Assistant Examiner*—Anthony Ojini
(74) *Attorney, Agent, or Firm*—Chapman and Cutler LLP

(57) ABSTRACT

Methods and apparatuses for spectacle lens chamfering, wherein a predetermined chamfer width is inputted from a peripheral edge of a lens shape of a spectacle frame and a chamfer locus on a refraction plane of a spectacle lens is obtained.

29 Claims, 11 Drawing Sheets

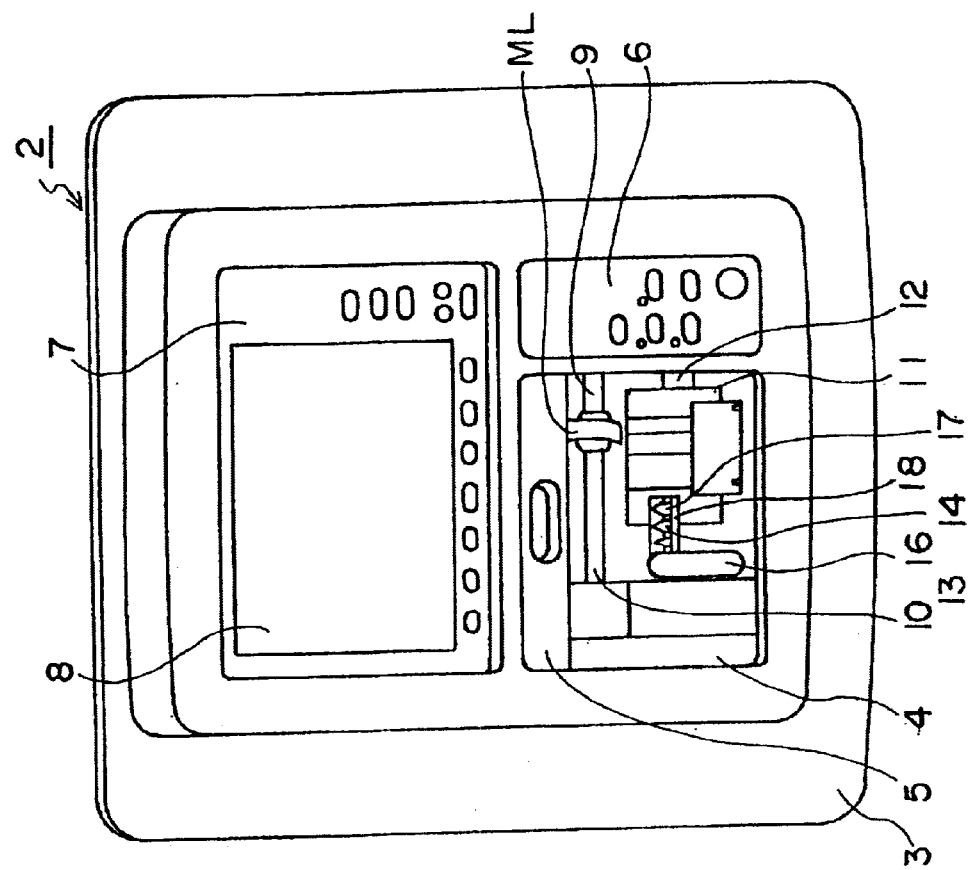
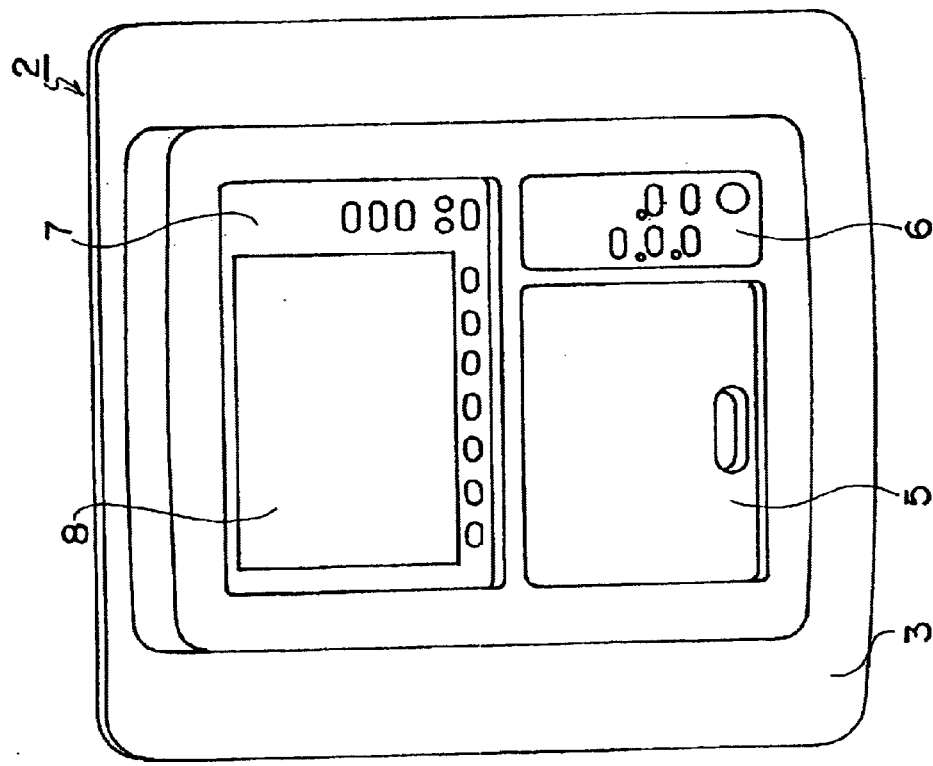

SPECTACLE LENS CHAMFERING DATA PREPARING METHOD, SPECTACLE LENS CHAMFERING METHOD, SPECTACLE LENS CHAMFERING DATA PREPARING APPARATUS, AND SPECTACLE LENS CHAMFERING APPARATUS

BACKGROUND OF THE INVENTION

1. Field of the Invention

The present invention relates to a method for preparing chamfering data necessary for chamfering a peripheral edge of a spectacle lens with use of a chamfering grinding wheel, a spectacle lens chamfering method, a spectacle lens chamfering data preparing apparatus, and a spectacle lens chamfering apparatus.

2. Description of the Prior Art

Heretofore, as chamfering apparatuses there have been known, for example, such lens grinding apparatuses as disclosed in Japanese Patent Laid Open Nos. 225853/1998, 225854/1998 and 225855/1998.

In these known lens grinding apparatuses, as shown in FIG. 11, a peripheral edge portion MLs of a base lens ML' is subjected to grinding to form a V-shaped protrusion MLy and thereafter it is possible to form chamfered portions MLmf and MLmr (which will be referred to as V shoulders) at both sides of the V-shaped protrusion V shoulders Hf and Hr of the resulting spectacle lens ML. The chamfered portion MLmr is formed at a position closer to a rear refraction plane MLr than the V-shaped protrusion MLy, while the chamfered portion MLmf is formed at a position closer to a front refraction plane MLf than the V-shaped protrusion MLy.

For example, the chamfered portion MLmr is formed by dividing a V shoulder width Hr (thickness of the V-shaped protrusion bottom) of the rear refraction plane MLr at a predetermined ratio Hr1:Hr2 and by chamfering the peripheral edge portion of the spectacle lens ML throughout the whole circumference while maintaining the above dividing ratio.

Likewise, the chamfered portion MLmf is formed by dividing a V shoulder width Hf (thickness of the V-shaped protrusion bottom) of the front refraction plane MLf at a predetermined dividing ratio Hf1:Hf2 and by chamfering the peripheral edge portion of the spectacle lens ML throughout the whole circumference while maintaining the dividing ratio.

It is also possible to divide an edge thickness Wi (at Wif:Wir ratio) with the apex of the V-shaped protrusion MLy as a boundary, then to chamfer the whole circumference of the spectacle lens ML with the V shoulder ratio Hf1, Hf2 and the ratio Hr1, Hr2 while maintaining the dividing ratio (Wif:Wir).

More specifically, the chamfered portion MLmr can be formed by dividing the V shoulder at a ratio of Hr1:Hr2=4:6 and chamfering the spectacle lens ML throughout the whole circumference while maintaining this dividing ratio.

Such a chamfering work is applied, for example, when the spectacle lens ML is increased, for example, due to an increase in the dioptric power of the spectacle lens ML. In this case, the distance from the lens center to lens edge end is longer on the ear-contacting side than the distance between the upper edge to the center, so the edge thickness is larger on the ear-contacting side. For this, conventionally, chamfering of the lens edge is performed in such a manner that a chamfering quantity (MLmf and MLmr) is larger at the ear-contacting side so that the edge thickness Wi appears thinner when the spectacle is worn.

Besides, the spectacle lens edge, i.e., the peripheral edge portion of the spectacle lens ML is fitted in a spectacle frame or the like. Accordingly, when the spectacle lens edge is chamfered to a degree such that the edge thickness Wi of the spectacle lens ML is slightly thicker than the rim thickness of the spectacle frame, the spectacle lenses can fit the taste of a person who wears the spectacle.

In the case where the thus-chamfered spectacle lens ML is fitted in a spectacle frame and the spectacle is worn by a user, it is not a sideways chamfered shape but a chamfered shape as seen from the front side that actually attracts attention of another person. That is, the portions which actually attract attention in the spectacle lens ML are the entire shapes of the chamfered portions MLmf and MLmr formed on the front and the rear refraction planes MLf, MLr, respectively, of the spectacle lens ML.

However, when the chamfered spectacle lens ML is seen from the front side, if the entire shapes of the chamfered portions MLmf and MLmr after chamfering do not draw beautiful curves along the rim of the spectacle frame, it cannot be said that the chamfering is successful.

It should be noted that there is no problem of the chamfered portions MLmf and MLmr when the right and left lenses have an identical dioptric power and an identical lens thickness and the frame shape is basically symmetrical in right and left direction. However, when a user of a spectacle has eyes of different refraction powers, the base lens ML' used for the right and left eyes also differ in thickness. That is, when the right and left eye-glasses have different dioptric powers, with the foregoing simple ratio (Hr1:Hr2 or Wif:Wir) will result in that the chamfer width Hmr of the chamfered portion MLmr formed on the rear refraction plane MLr differs greatly between the right and left spectacle lenses ML. This is not desirable because the spectacle frame looks different in shape on the right and left sides thereof in appearance. In other words, it is preferred for the spectacle frame not to be seen different in shape on the right and lefts sides thereof in appearance. Accordingly, when using right and left base lenses ML' of different dioptric powers, if it is preferable that right and left chamfered portions MLmr are almost equal to each other (symmetry right and left).

SUMMARY OF THE INVENTION

It is therefore an object of the present invention to provide a spectacle lens chamfering data creation method, a spectacle lens chamfering method, a spectacle lens chamfering data creation apparatus, and a spectacle lens chamfering apparatus which are capable of chamfering viewed from the front or rear surface of the spectacle lens, chamfering preferable for a user of the spectacle, collecting lens edge shape data along the chamfering locus, and chamfering based on the collected data.

For achieving the aforementioned object, the present invention provides a spectacle lens chamfering data creation method comprising steps of: entering spectacle frame lens shape information and a predetermined chamfer width; and calculating a chamfer locus on a refraction plane of a spectacle lens having the lens shape obtained by using the lens shape information.

According to another aspect of the present invention, the spectacle lens chamfering data creation method comprises steps of: entering spectacle frame lens shape information and a predetermined chamfer width; and obtaining data on a lens edge/shape along a chamfer locus on a refraction plane of a spectacle lens having the lens shape obtained by using the lens shape information.

According to still another aspect of the present invention, the spectacle lens chamfering data creation method comprising steps of: entering spectacle frame lens shape information and a reference chamfer width at a radius vector at a predetermined angle of the lens shape information; entering a minimum chamfer width at a radius vector at another angle of the lens shape information; and obtaining a chamfer locus on a refraction plane of a spectacle lens by using a position of the reference chamfer as one reference and a position of the minimum chamfer as another reference.

According to yet another aspect of the present invention, the spectacle lens chamfering data creation method comprises steps of: entering spectacle frame lens shape information and a reference chamfer width at a radius vector at a predetermined angle of the lens shape information; entering a minimum chamfer width at a radius vector at another angle of the lens shape information; obtaining a chamfer locus on a refraction plane of a spectacle lens by using a position of the reference chamfer as one reference and a position of the minimum chamfer as another reference; and obtaining data on a spectacle lens edge thickness/shape along the chamfer locus.

According to yet still another aspect of the present invention, chamfer width values at several points of the spectacle lens shape (periphery) are entered to obtain the chamfer locus according to the chamfer width values at the respective points.

According to still yet another aspect of the present invention, the spectacle lens chamfering method comprises steps of: obtaining a chamfer locus by using the aforementioned spectacle lens chamfering data creation method; calculating a spectacle lens edge thickness along the obtained chamfer locus; and performing chamfering.

In one aspect of the apparatus for preparing spectacle lens chamfering data according to the present invention, the apparatus comprises a lens shape data input means for inputting lens shape data of a spectacle frame, a chamfer width input means for inputting a predetermined chamfer width from a peripheral edge of the inputted lens shape, and a computing means for determining a chamfer locus on a refraction plane of a spectacle lens from the inputted chamfer width.

In another aspect of the apparatus for preparing spectacle lens chamfering data, the apparatus comprises a lens shape data input means for inputting lens shape data of a spectacle frame, a chamfer width input means for inputting a predetermined chamfer width from a peripheral edge of the inputted lens shape, a computing means for determining a chamfer locus on a refraction plane of a spectacle lens from the inputted chamfer width, and an edge thickness shape data input means for inputting edge thickness shape data of the spectacle lens along the chamfer locus thus determined.

In a further aspect of the apparatus for preparing spectacle lens chamfering data, the apparatus comprises a lens shape data input means for inputting lens shape data of a spectacle frame, a chamfer width input means for inputting a chamfer width of a reference chamfer from a first peripheral edge of the inputted lens shape and inputting a chamfer width of a minimum chamfer from a second peripheral edge of the lens shape in another meridian direction, and a computing means for determining a chamfer locus on a refraction plane of a spectacle lens with a chamfer end position of the reference chamfer and that of the minimum chamfer as a reference.

In a still further aspect of the apparatus for preparing spectacle lens chamfering data, the apparatus comprises a lens shape data input means for inputting lens shape data of a spectacle frame, a chamfer width input means for inputting a chamfer width of a reference chamfer from a first peripheral edge of the inputted lens shape and inputting a chamfer width of a minimum chamfer from a second peripheral edge of the lens shape in another meridian direction, a computing means for determining a chamfer locus on a refraction plane of a spectacle lens with a chamfer end position of the reference chamfer and that of the minimum chamfer as a reference, and an edge thickness shape data input means for inputting edge thickness shape data of the spectacle lens along the chamfer locus.

In a still further aspect of the apparatus for preparing spectacle lens chamfering data, in combination with any of the above apparatus, the chamfer width input means inputs a chamfer width in a normal line direction from each of peripheral edge points of the lens shape of the spectacle frame, and the computing means determines a chamfer locus with a chamfer end position at each of the peripheral edge points as a reference.

Further, in one aspect of the apparatus for chamfering a spectacle lens according to the present invention, the apparatus comprises a chamfering wheel for chamfering a spectacle lens on the basis of edge thickness shape data of the spectacle lens obtained along a chamfer locus, the chamfer locus being obtained using any of the above spectacle lens chamfering data preparing apparatuses.

BRIEF DESCRIPTION OF THE ATTACHED DRAWINGS

FIG. 3A is a plan view of the lens grinding apparatus of FIG. 1 with the cover closed.

FIG. 3B is a plan view of the lens grinding apparatus shown in FIG. 3A with the cover opened;

DESCRIPTION OF THE PREFERRED EMBODIMENT

Description will now be directed to an embodiment of the present invention with reference to the attached drawings.

Construction

Figure 1:
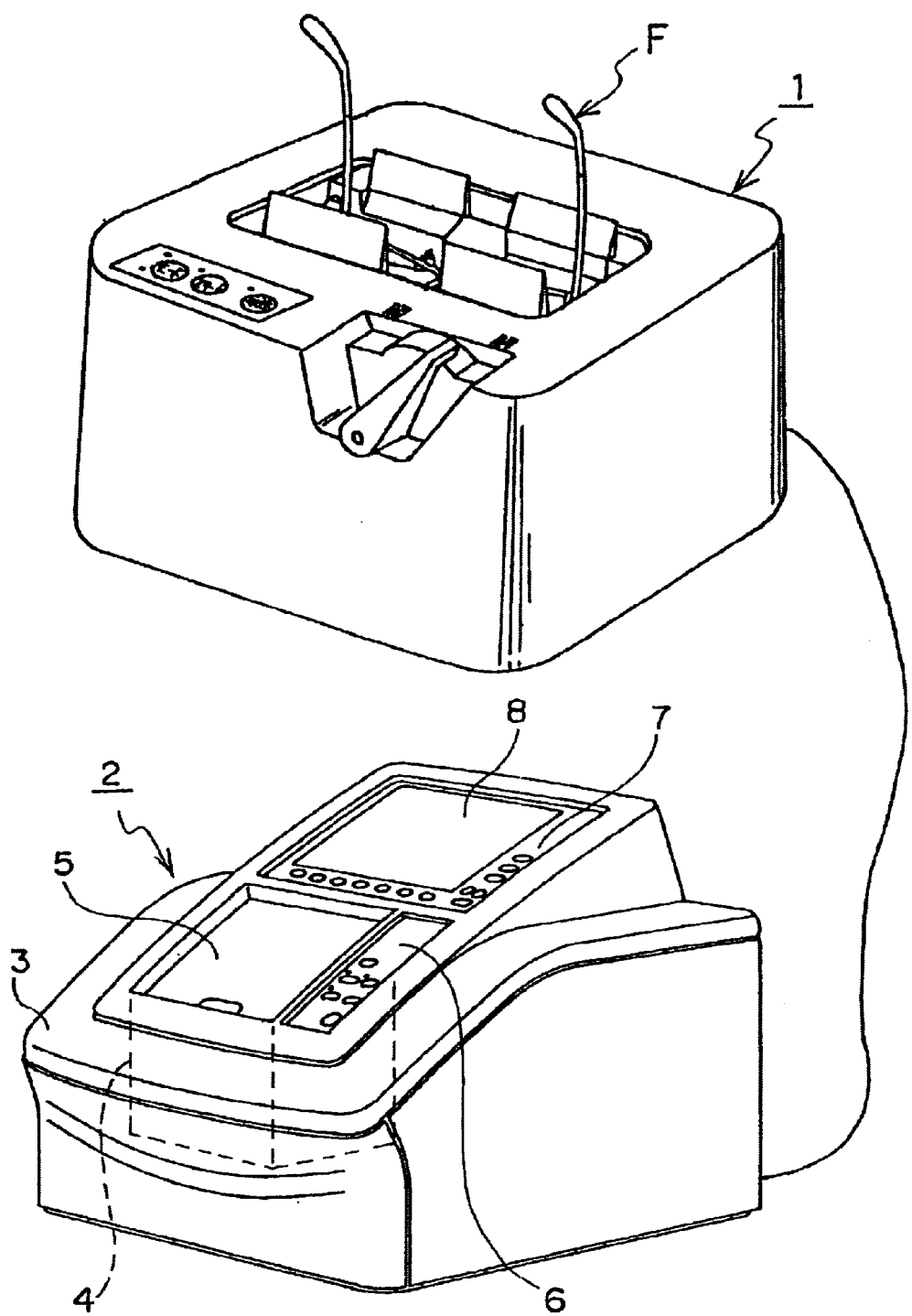
FIG. 1 shows a relationship between a lens grinding apparatus having a chamfering apparatus according to an embodiment of the present invention and a layout display unit, and a frame shape measuring apparatus.

In FIG. 1, a reference symbol 1 denotes a frame shape measuring apparatus (a lens shape measuring apparatus) for reading lens shape information (θi, ρi) as lens shape data from a lens frame shape of a spectacle frame F or a template thereof or a lens shape model, and a reference symbol 2 denotes a lens grinding apparatus (a lens edge grinder) for grinding a spectacle lens in accordance with the lens shape data of the spectacle frame entered from the frame shape measuring apparatus 1 by way of signal transmission, for example. As for the frame shape measuring apparatus 1, it is possible to employ a conventional one, so explanations of its detailed construction and a data measuring method will be omitted.

Lens Grinding Apparatus 2

Figure 2A:
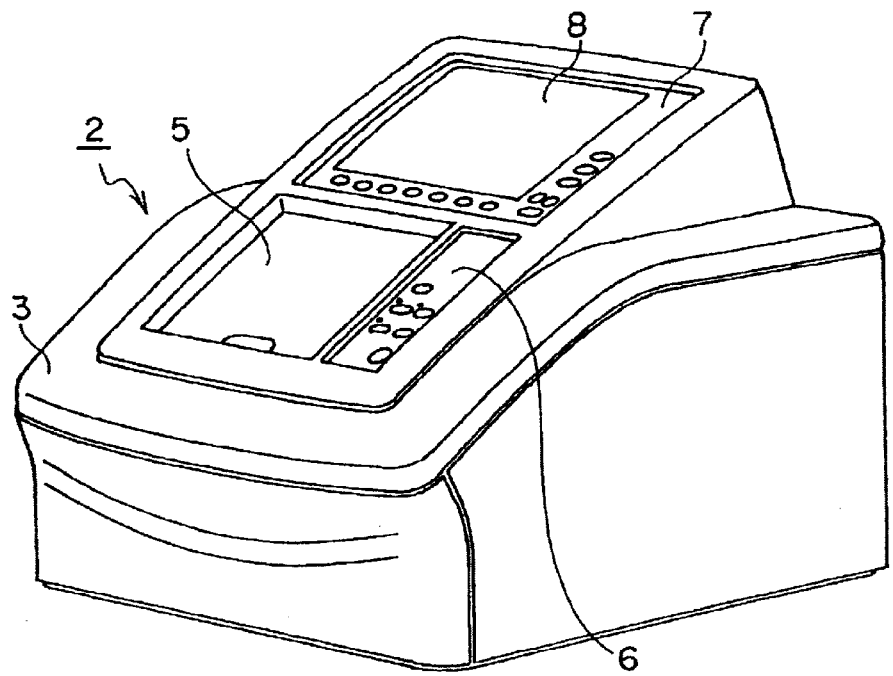
FIG. 2A is a perspective view of the lens grinding apparatus of FIG. 1 with its cover closed.
Figure 2B:
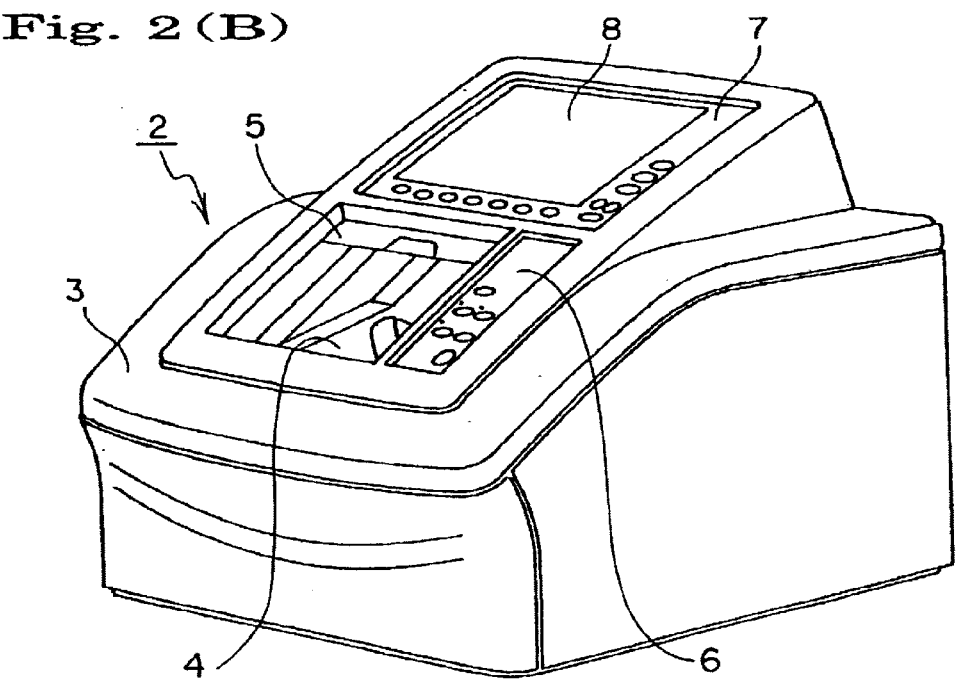
FIG. 2B is a perspective view of the lens grinding apparatus of FIG. 1 with its cover opened.

As shown in FIGS. 2 and 3, the lens grinding apparatus 2 has an apparatus main body 3, a grinding chamber 4 formed at a position closer to a front side of the apparatus main body 3, and a cover 5 for opening and closing the grinding chamber 4. In the lens grinding apparatus 2, a main grinding is disposed within the grinding chamber 4, and a drive system (motor, etc.) for the main grinding portion is disposed outside the grinding chamber 4 and within the apparatus main body 3. The lens grinding apparatus 2 further includes: a first operation panel 6 and a second operation panels 7 to be used for controlling the drive system and for setting data; and a liquid crystal display unit 8 for displaying operation states performed through the operation panels 6 and 7 and the like.

Figure 4:
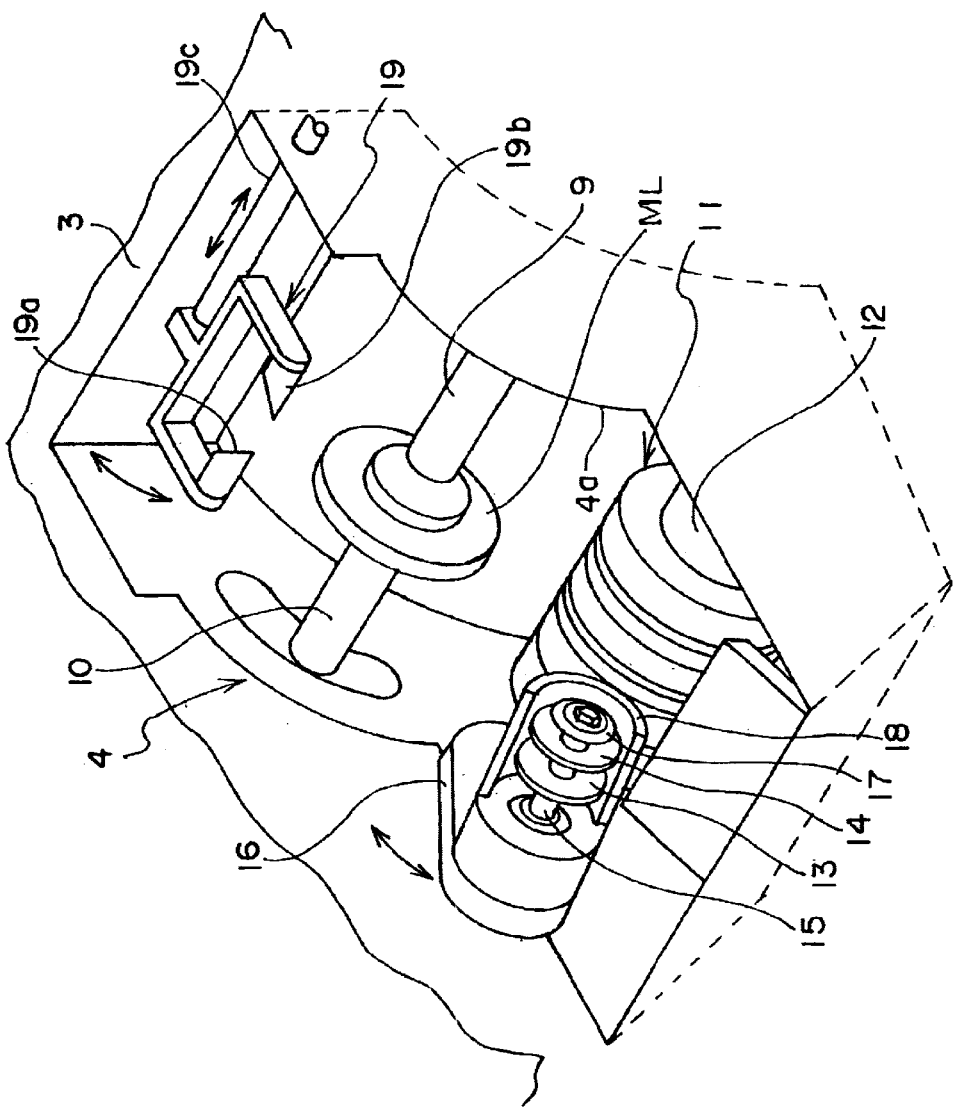
FIG. 4 is a perspective view of an essential portion in a processing chamfer of the lens grinding apparatus of FIG. 1.

As shown in FIG. 4, the main grinding portion disposed in the grinding chamber 4 includes: a right lens shaft 9 and left lens shaft 10 extending in right/left direction of the apparatus main body 3 and functioning to hold (grip) and rotate a spectacle lens ML; a grinding wheel 11 for grinding the spectacle lens ML; and a grinding wheel shaft 12 for rotating the grinding wheel 11.

The main grinding portion in the grinding chamber 4 also includes: chamfering wheels 13 and 14 for chamfering a peripheral edge portion of the spectacle lens ML; a chamfering shaft 15 for rotating the chamfering wheels 13 and 14; a rotating arm 16 for driving and rotating the chamfering shaft 15; a grooving cutter 17 mounted on the chamfering shaft 15 at a position adjacent to the chamfering wheel 14; and a half-cylindrical cover 18 covering lower portions of the chamfering wheels 13, 14 and the grooving cutter 17.

The main grinding portion disposed in the grinding chamber 4 further includes: a hose (not depicted) disposed inside the half-cylindrical cover 18 to splash grinding water onto the grinding wheel 11 and the grinding surface of the chamfering wheels 13 and 14; and a lens edge thickness measuring member 19 for measuring an edge thickness Wi of the spectacle lens ML.

The cover 5 is made from a single colorless transparent or colored transparent (e.g., translucent like dark blue) glass sheet or resin panel and is adapted to glide back and forth of the apparatus main body 3.

The grinding chamber 4 has a back wall located behind the spectacle lens ML, which wall has a roundish slant surface enabling easy flow of grinding chips.

Drive System for the Main Grinding Portion

The drive system for the main grinding portion has a carriage (not depicted) whose front portion can swing or pivot (vertically move) with a rotation center at its rear end. The carriage can also move rightward and leftward. The pair of lens shafts 9 and 10 extending right and left are held rotatably in the front end portion of the carriage, and are moved toward and away from the grinding wheel 11 when the front end portion of the carriage moves vertically. The lens shaft 10 is arranged so as to be adjusted in its position in its axial direction, i.e., advance and retreat with respect to the lens shaft 9. Therefore, when the lens shaft 10 is axially moved away from the lens shaft 9 to increase the distance between the lens shafts 9 and 10, the spectacle lens (lens to be ground) ML can be placed between the lens shafts 9 and 10 or can be removed from between the lens shafts 9 and 10. By moving the lens shaft 10 near to the lens shaft 9 in their axial direction, the spectacle lens ML thus arranged between the lens shafts 9 and 10 can be gripped between the lens shafts, as shown in FIG. 4.

The drive system includes: vertically moving means (not depicted) for pivoting the carriage vertically by using a drive motor such as a pulse motor for example; a drive motor (not depicted) such as a pulse motor for moving the carriage rightward and leftward; a drive motor (not depicted) such as a pulse motor for rotating the lens shafts 9 and 10; and a drive motor (not depicted) for rotating the grinding wheel 11 when grinding the spectacle lens ML held between the lens shafts 9 and 10 with a vertical pivotal movement of the carriage.

The drive motors and the structure for moving the carriage in such a drive system may be conventional ones, so the details thereof will here be omitted. The grinding wheel 11 includes a rough grinding wheel, a V-shape grinding wheel, and a finish grinding wheel.

In this drive system, the lens shafts 9 and 10 are rotated by an angle θi (i=0, 1, 2, 3, . . . n) according to lens shape information (θi, ρi) using a drive motor (not depicted) and the front end portion of the carriage is made to swing vertically by an angle θi by means of a drive motor (not depicted) so as to vertically move the lens shafts 9 and 10 and the spectacle lens ML, thereby grinding the peripheral edge of the spectacle lens ML with the rough grinding wheel of the grinding wheel 11 which is rotating. Here, the drive system operates in such a manner that the front end portion of the carriage is made to swing vertically by every angle θi so that a shaft-to-shaft distance between the lens shafts 9, 10 and the grinding wheel shaft 12 becomes equal to wheel radius+radius vector ρi at every angle θi. In this way the spectacle lens ML is roughly ground into a lens shape with the grinding wheel 11.

Moreover, the drive system controls the drive motors in accordance with lens shape information (θi, ρi) in the same manner as above, so as to form a V-shaped protrusion at a peripheral edge of the spectacle lens ML which has been roughly ground into the lens shape, with the V-shape grindstone of the grinding wheel 11. Here, the drive system controls the drive motor for moving the carriage right and left in accordance with preset V-shape position data so as to form a V-shaped protrusion at an edge end of the spectacle lens M which has been roughly ground into the lens shape. It should be noted that the aforementioned processing, i.e., a grinding work for the spectacle lens ML may be performed by a known conventional method, so a detailed explanation thereof will here be omitted.

Edge Thickness Measuring Member 19

The edge thickness measuring member 19 has a pair of feelers 19a and 19b spaced away from each other and facing each other. The edge thickness measuring member 19 having the feelers 19a and 19b is integrally provided on a measurement shaft 19c extending in the right and left direction. The measurement shaft 19c extends through a side wall 4a of the grinding chamber 4 and can slide right and left. Further, the measurement shaft 19 is urged by a spring (not depicted) so that the feelers 19a and 19b are set at a center portion in the right and left direction of an upper portion of the grinding chamber 4. Therefore, even if the feelers 19a, 19b and the measurement shaft 19c are moved in the axial direction (right and left direction) of the measurement shaft 19c, once the moving force thereof is released, the feelers 19a and 19b are returned to the center in the transverse direction of the upper portion of the grinding chamber 4 with the biasing force of the spring.

Besides, outside the grinding chamber 4 is provided a measuring block (not depicted) interlocked with the measurement shaft 19c for detecting and measuring transverse movement positions (or movement amounts) of the feelers 19a, 19b and the measurement shaft 19c. More specifically, movement positions or amounts in the transverse direction of the feelers 19a, 19b and the measurement shaft 19c are read by a read sensor (position detecting means or movement amount detecting means) (not depicted) built in the measuring section (not depicted). The measurement shaft 19c is provided so that it can be rotated about an axis thereof by drive means such as a pulse motor (not depicted). The drive means rotates the measurement shaft 19c between a stand-by position (stand-by state) in which the feelers 19a and 19b stand up and an operating position (operating state) in which the feelers are tilted forward to a horizontal position. This rotational drive is effected by a control circuit which will be described later.

It should be noted that when measuring the edge thickness Wi of the spectacle lens ML based on the lens shape information ($\theta i$, $\rho i$), the spectacle lens ML is held by the lens shafts 9 and 10 and the feelers 19a and 19b are set to the horizontal position.

In this state, by moving the lens shafts 9 and 10 together with the carriage vertically and transversely using the drive motor, it is possible to bring one of the pair of fillers into abutment with the front plane or the rear plane of the spectacle lens ML.

The tip of the feeler 19a is thus brought into abutment with the front refraction plane of the spectacle lens M and the lens shafts 9 and 10 are rotated at every angle $\theta i$ in accordance with lens shape information ($\theta i$, $\rho i$) using the drive motor. The carriage is moved vertically and transversely by the drive motor so that the distance from the center line of the lens shafts 9 and 10 to the filler 19a becomes equal to the radius vector $\rho i$ at every angle $\theta i$, whereby the tip of the feeler 19a can be moved for contact to the position of the radius vector $\rho i$ of the front refraction plane of the spectacle lens ML at every angle $\theta i$.

Similarly, the tip of the feeler 19b is thus brought into abutment with the rear refraction plane of the spectacle lens ML and the lens shafts 9 and 10 are rotated at every angle $\theta i$ in accordance with lens shape information ($\theta i$, $\rho i$) using the drive motor. The carriage is moved vertically and transversely by the drive motor so that the distance from the center line of the lens shafts 9 and 10 to the filler 19a becomes equal to the radius vector $\rho i$ at every angle $\theta i$, whereby the tip of the feeler 19b can be moved for contact to the position of the radius vector $\rho i$ of the rear refraction plane of the spectacle lens ML at every angle $\theta i$.

Therefore, to determine the edge thickness Wi of the spectacle lens ML, firstly, the feeler 19a is used to measure a movement amount of the front refraction plane of the spectacle lens ML in the transverse direction (optical axis direction, i.e., the extending direction of the axis of the lens shafts 9 and 10), i.e., the movement amount of the tip of the feeler 19a, at the lens shape information ($\theta i$, $\rho i$) using a read sensor (not depicted) of the measuring block. Next, the feeler 19b is used to measure a movement amount of the rear refraction plane of the spectacle lens ML in the transverse direction (optical axis direction, i.e., the extending direction of the axis of the lens shafts 9 and 10), i.e., the movement amount of the tip of the feeler 19a, at the lens shape information ($\theta i$, $\rho i$) using the read sensor (not depicted) of the measuring block.

Here, it is assumed that that xa is a distance from a central position between the feelers 19a and 19b to each of the feelers 19a and 19b which are at their initial positions; fa is a leftward shift amount from the initial position of the feelers 19a and 19b; –fb is a rightward shift amount from the initial position of the feelers 19a and 19b; and –xa is the initial position of the feeler 19a. Then, the rightward or leftward shift amount Fa of the tip of the feeler 19a is obtained as xa+fa and the rightward or leftward shift amount Fb of the tip of the feeler 19b is obtained as –(xa+fb). Since the shift amount Fa and Fb indicate positions from the initial positions, respectively, they will also be referred to as shifted position.

From the thus-obtained shifted positions Fa and Fb of the tips of the feelers 19a and 19b in the lens shape information ($\theta i$, $\rho i$), the spacing between the shifted positions Fa and Fb corresponds to the edge thickness Wi of the spectacle lens ML in the lens shape information ($\theta i$, $\rho i$).

Operation Panel 6

Figure 5A:
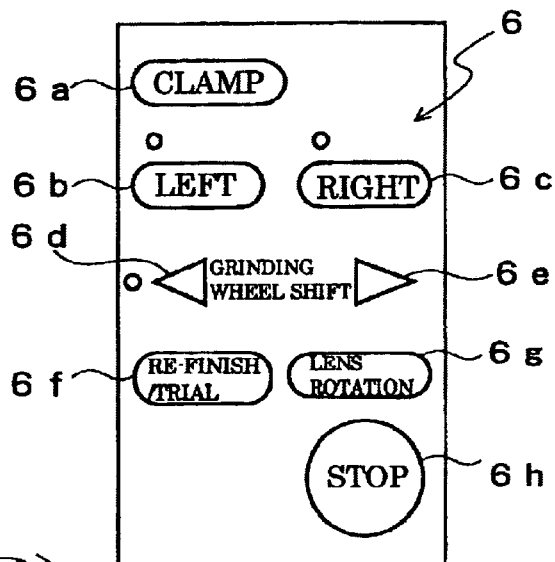
FIG. 5A is an enlarged explanatory view of a first operation panel in the lens grinding apparatus of FIG. 1.

As shown in FIG. 5A, the operation panel 6 includes: a "clamp" switch 6a for clamping the spectacle lens with lens shafts 9 and 10; a "left" switch 6b and a "right" switch 6c for specifying (change-over between) grinding for the right eye and grinding for the left eye of the spectacle lens as well as change-over of display; "grinding wheel shift" switches 6d and 6e for shifting the grinding wheel in the right and left direction, "refinish/trial" switch 6f for refinishing a spectacle lens whose finishing is not complete or for trial grinding, a "lens rotation" switch 6g for a lens rotation mode, and a "stop" switch 6h for a rotation stop mode.

Operation Panel 7

Figure 5B:
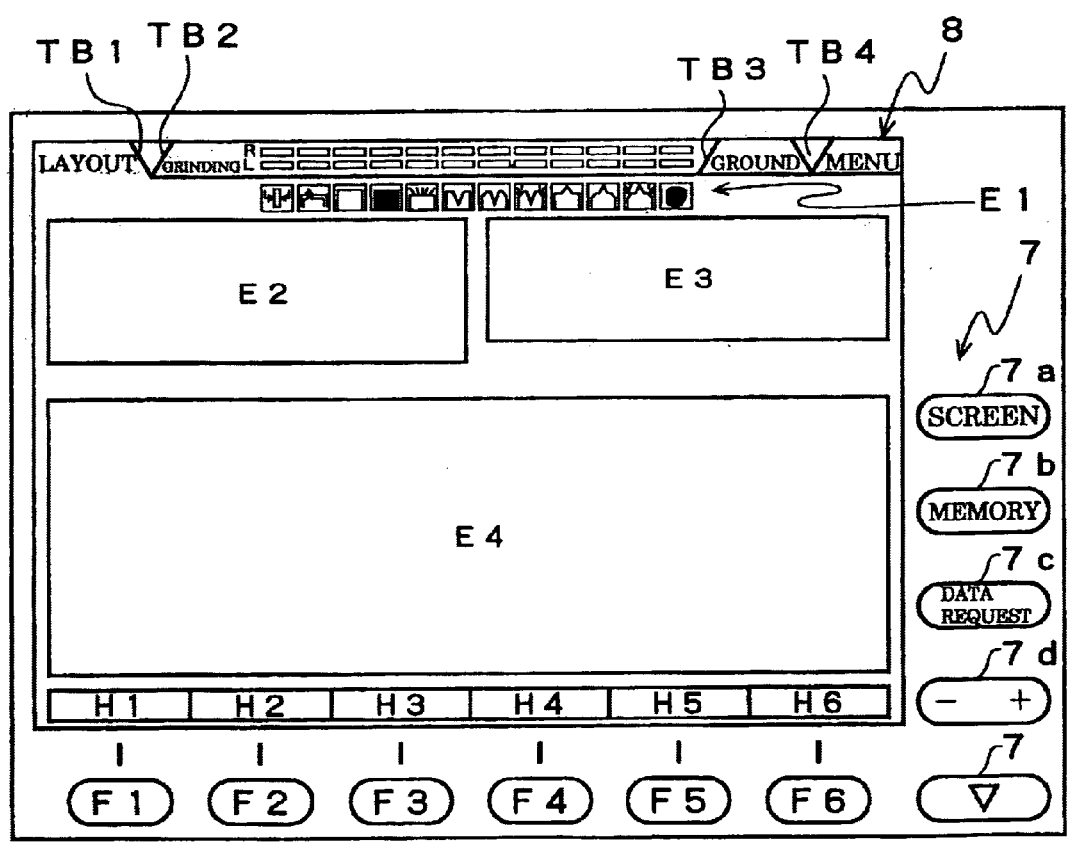
FIG. 5B is a front view of a liquid crystal display in the lens grinding apparatus of FIG. 1.

As shown in FIG. 5B, the operation panel 7 includes: a "screen" switch 7a for switching between display states of the liquid crystal display unit 8, a "memory" switch 7b for storing values set for grinding associated with the processing displayed on the liquid crystal display unit 8, a "data request" switch 7c for fetching lens shape information ($\theta i$, $\rho i$), a "–/+" toggle switch 7d used for correcting numerical values for example (this toggle switch may be replaced by two separate switches: "–" switch and "+" switch), and a "∇" switch 7e for moving a cursor type pointer. These switches are arranged at a side of the liquid crystal display unit 8. Further, function keys F1 to F6 are arranged below the liquid crystal display unit 8.

The function keys F1 to F6 are used not only for settings upon grinding of the spectacle lens but also for response/selection in response to messages displayed on the liquid crystal display unit 8 in the course of grinding.

Liquid Crystal Display Unit 8

At an upper portion of the liquid crystal display unit 8 there are displayed a "layout" tab TB1, a "grinding" tab TB2, a "ground" tab TB3, and a "menu" tab TB4. The display of the liquid crystal display unit 8 is changed over by selecting these tabs TB1, TB2, TB3, and TB4.

Moreover, at the bottom of the liquid crystal display unit 8 there are provided function display portions H1–H6 corresponding to the function keys F1–F6. The function display portions H1–H6 display contents required according to the situation. Further, when the function display portions H1–H6 are in a non-display state, it is possible to display patterns, numerical values, or states, different from those corresponding to the functions of the function keys F1–F6 at the bottom of the liquid crystal display unit 8.

When any of the "layout" tab TB1, the "grinding" tab TB2, and the "ground" tab TB3 is selected, contents which will be detailed later are displayed on the screen divided into an icon display area E1, a message display area E2, a numerical value display area E3, and a state display area E4. Moreover, when the "menu" tab TB4 is selected, it is optional whether to use a single menu display area or divided areas.

Icons displayed in the icon display area E1 are arranged side by side correspondingly to various work states; a state of measuring an edge thickness/shape of a spectacle lens in accordance with lens shape information (θi, ρi) as lens data, a state of simulating the V shape to be formed at an edge face of the spectacle lens, a state of roughly grinding the lens edge face, a state of finish-grinding the edge face, a state of mirror-finishing the edge face, a state of grooving the edge face, a state of grooving and chamfering the edge face, a state of grooving, chamfering and mirror-finishing the edge face, a state of forming a V-shaped protrusion at the edge face, a state of forming and chamfering a V-shaped protrusion at the edge face, a state of forming, chamfering, and mirror-finishing the V-shaped protrusion at the edge face, and a state of end of the spectacle lens grinding work. These works are carried out successively in series.

The aforementioned states are respectively indicated by a plurality of indicators (cursor indicators) arranged above the corresponding icons so that an operator can recognize in which state the processing is being carried out. The indicators are arranged in two rows in the area of the "grinding" tab TB2: one for the right eye and the other for the left eye. Each of the indicators is lit as the series of works progresses.

The message display area E2 is used to display various error messages and warning messages according to states. In the case of a warning message relating to a danger of damage to a component of the apparatus or damage to the lens being ground, it is also possible to display the message protruding out of the message display area E2 so that the operator can easily recognize the displayed warning message.

The numerical value display area E3 is used to display, upon layout data input, a geometrical shaft-to-shaft distance (FPD value) of right and left lens frames of a spectacle frame, a pupil-to-pupil distance (PD value) of the glasses wearer's eyes, a vertical component UP value (or H1p value) of a decentration quantity which is a difference between the FPD value and the PD value, and various grinding size adjusting items. Moreover, upon initialization, the area E3 is used to display a chuck center of the lens to be ground in addition to the above FPD, PD, UP, and size. Further, upon monitor data input, the area E3 displays dimensional numerical values related to chamfering and mirror-finishing of the spectacle lens.

The state display area E4 is used to display layout images of spectacle lenses for right and left eyes, shape of a V-shaped protrusion to be formed at the peripheral edge portions of the maximum, minimum, and intermediate (arbitrary) edge thickness values, lens side shapes viewed from sideways, a schematic diagram conforming to the actual state of grinding.

It should be noted that display on the liquid crystal display unit 8 while performing layout or immediately after system start-up or data request or upon completion of layout setting or course selection and display states of the liquid crystal display unit 8 while checking the lens edge thickness or during and at the end of grinding of a right-eye or left-eye lens, during confirmation and data storage, indication by the error icon, and display states during grooving and chamfering, trial grinding, and additional grinding and re-finishing as well as related operations may be identical to those disclosed in Japanese Patent Application No. 2000-287040 or 2000-290864.

Control Circuit

Figure 6:
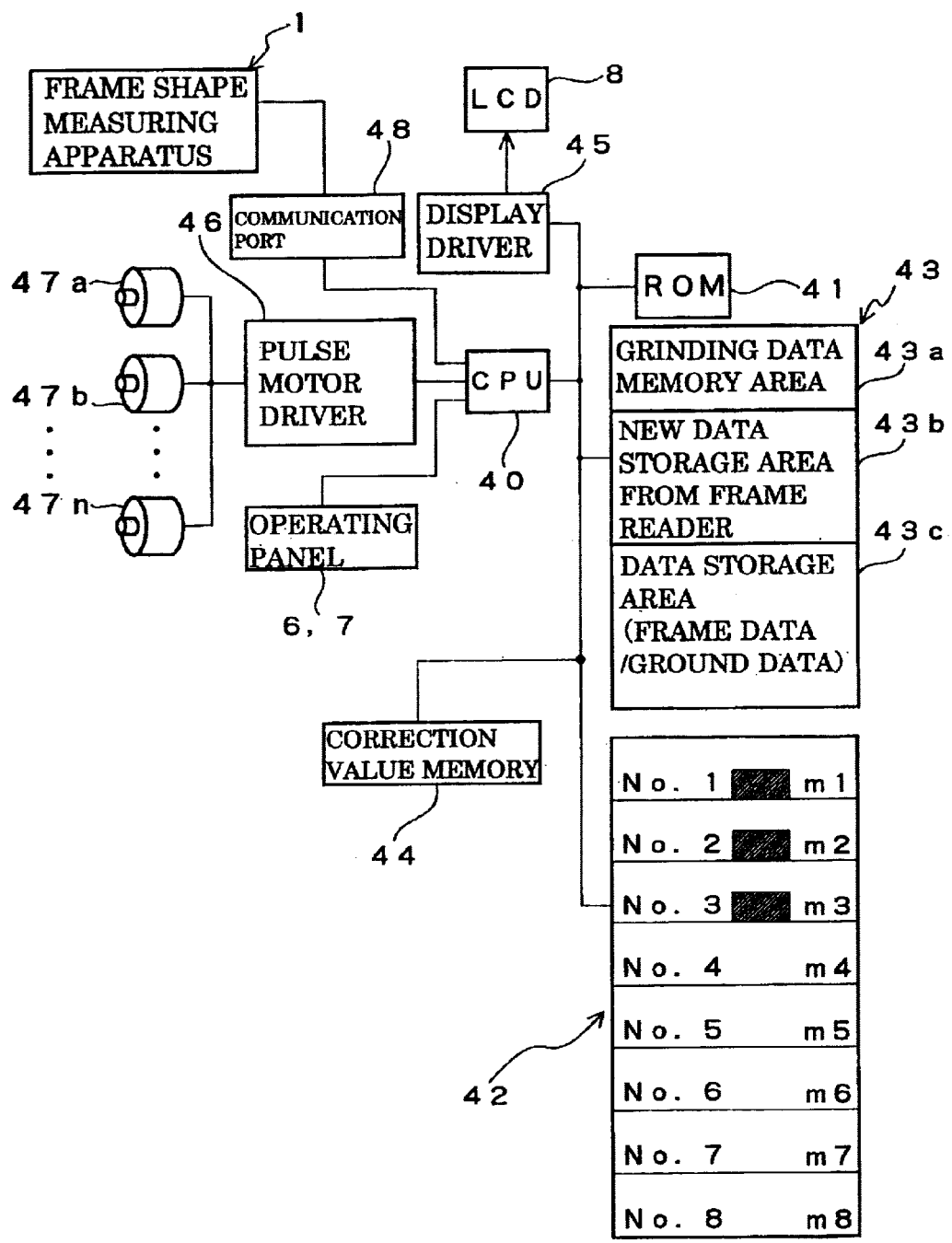
FIG. 6 is an explanatory diagram of a control circuit in the lens grinding apparatus of FIG. 1.

As shown in FIG. 6, the lens grinding apparatus 2 has an calculation/control circuit 40.

The calculation/control circuit 40 having a CPU is connected to the operation panel 6, a ROM 41 as storage means, a data memory 42 as storage means, a RAM 43, and a correction value memory 44. Furthermore, the calculation/control circuit 40 is also connected to the liquid crystal display unit 8 through a driver 45 for display, to various drive motors (pulse motors) 47a, . . . 47n in the drive system through a pulse motor driver 46, and to the frame shape measuring apparatus 1 shown in FIG. 1 through a communication port 48.

For example, it is assumed that a drive motor such as a pulse motor for vertically moving the carriage is 47a, a drive motor such as a pulse motor for moving the carriage right and left is 47b, a drive motor such as a pulse motor for rotating the lens shafts 9 and 10 is 47c, a drive motor for rotating, the grinding wheel 11 is 47d, a drive motor such as a pulse motor for vertically swinging the rotating arm 16 is 47e, and a drive motor such as a pulse motor for rotating the chamfering shaft (rotary shaft) 15 is 47f. In this case, by controlling the drive motor 47a to rotate in a forward direction or reverse direction, it is possible to vertically move the carriage; by controlling the drive motor 47b to rotate in a forward or reverse direction, it is possible to move the carriage rightward or leftward; by controlling the drive motor 47c to rotate in a forward or reverse direction, it is possible to rotate the lens shafts 9 and 10 in a forward or reverse direction; by controlling rotation of the drive motor 47e, it is possible to control rotation of the grinding wheel 11; by controlling the drive motor 47f to rotate in a forward or reverse direction, it is possible to swing the rotating arm 16 upward or downward; and by controlling rotation of the drive motor 47f, it is possible to control rotation of the chamfering shaft (rotary shaft) 15. Such controls for the operation of the drive motors 47a—47f in the drive system can be performed by the calculation/control circuit 40.

Figure 7:
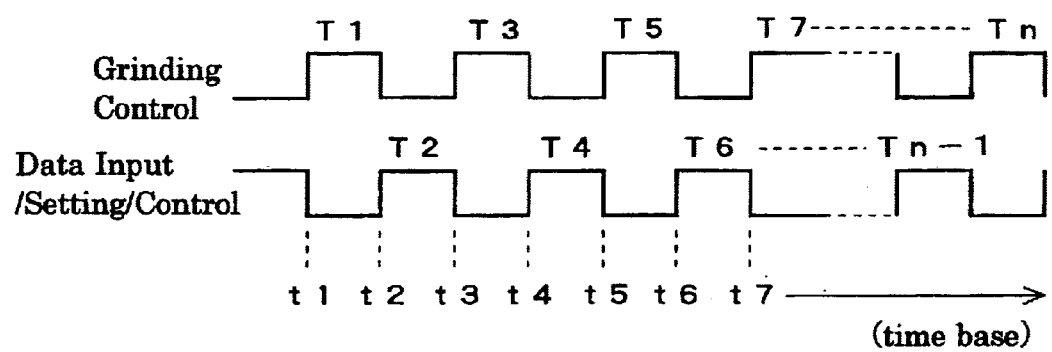
FIG. 7 is a time chart for explaining control performed by the control circuit.

If data read is performed from the frame shape measuring apparatus 1 or from storage areas m1~m8 of the data memory 42 after grinding control is started, the calculation/control circuit 40 performs time-division processing control and layout setting as shown in FIG. 7.

More specifically, if a time interval between time points t1 and t2 is T1, a time interval between time points t2 and t3 is T2, a time interval between time points t3 and t4 is T3, and a time interval between time points tn-1 and tn is Tn, a grinding control is performed during the time intervals T1, T3, . . . Tn while data read control and layout setting control are performed during the time intervals T2, T4, . . . Tn–1. Therefore, while grinding a lens to be processed, it is possible to input and store another lens shape data and to read out data as well as to set (adjust) a layout, thereby enabling to significantly improve efficiency of the data processing work.

In the ROM 41 are stored various programs for controlling the operation of the lens grinding apparatus 2. In the data memory 42 are provided a plurality of data storage areas.

The RAM 43 has a grinding data storage area 42a for storing grinding data, a new data storage area 43b for storing new data, and a data storage area 43c for storing frame data and data after grinding.

It should be noted that the data memory 42 may be an FEEPROM (flash EEPROM) capable of read and write or a RAM with backup power supply whose contents are not erased even if a main power supply is turned OFF.

Next, explanation will be given on the lens grinding apparatus including the calculation/control circuit 40 of the aforementioned configuration.

When the main power supply is turned ON in a state waiting for start, the calulation/control circuit 40 determines whether data-read from the frame shape measuring apparatus 1 is present.

More specifically, the calculation/control circuit 40 decides whether the "data request" switch 7c on the operation panel 6 has been pressed or not. If the switch 7c has been pressed and a data request exists, the calculation/control circuit 40 inputs data of lens shape information ($\theta i$, $\rho i$) from the frame shape measuring apparatus 1 into the data storage area 43b of RAM 43. The data thus inputted is stored (recorded) in any of the storage areas m1~m8 of the data memory 42.

When the "right" switch 6c or the "left" switch 6b is pressed to issue a grinding start instruction, the drive motors 47a–47n are controlled through the pulse motor driver 46 to start a grinding control and the calculation/control circuit 40 successively performs edge thickness measurement, V-shaped protrusion setting, rough grinding (incl. V-shape grinding), and finishing.

Calculating Chamfer Shape

In accordance with the lens shape information ($\theta i$, $\rho i$) inputted from the frame shape measuring apparatus 1 to the lens grinding apparatus 2, the calculation/control circuit 40 calculates a chamfer locus (chamfer shape) of the spectacle lens ML viewed from the front refraction plane side after chamfering.

Firstly, at each of the radius vector points (peripheral edge points of the lens) of the lens shape information ($\theta i$, $\rho i$), the calculation/control circuit 40 inputs a predetermined chamfer width Hmf (Hmr) of each of the points in the normal line direction from each of the radius vector points (peripheral edge points of the lens).

In this case, a horizontal radius vector line (180°, $\rho s$) in the lens shape lies on the ear contacting side and the chamfer at this radius vector line (180°, $\rho s$) is assumed to be a reference chamfer [radius vector point (first peripheral edge)]. The radius vector angle 180° means a rotational angle $\theta i$ of 180° in a polar coordinate form ($\theta i$, $\rho i$). The radius vector line (180°, $\rho s$) represents a radius vector line at a position resulting from 180° counterclockwise turn of the right-hand meridian when viewed from the origin.

It should be noted that the present invention is not limited to the aforementioned. It is also possible to set an arbitrary radius vector line other than the horizontal radius vector line as the reference chamfer.

Figure 8A:
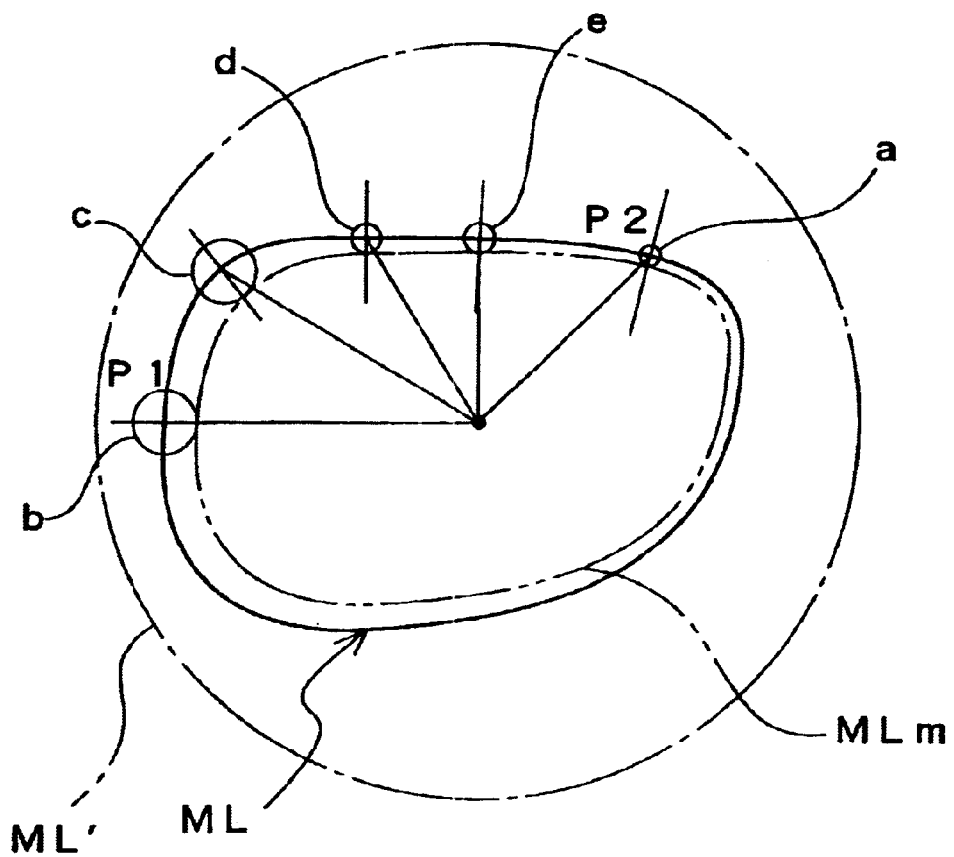
FIG. 8A is an explanatory diagram for explaining a spectacle lens chamfering method according to the present invention.
Figure 8B:
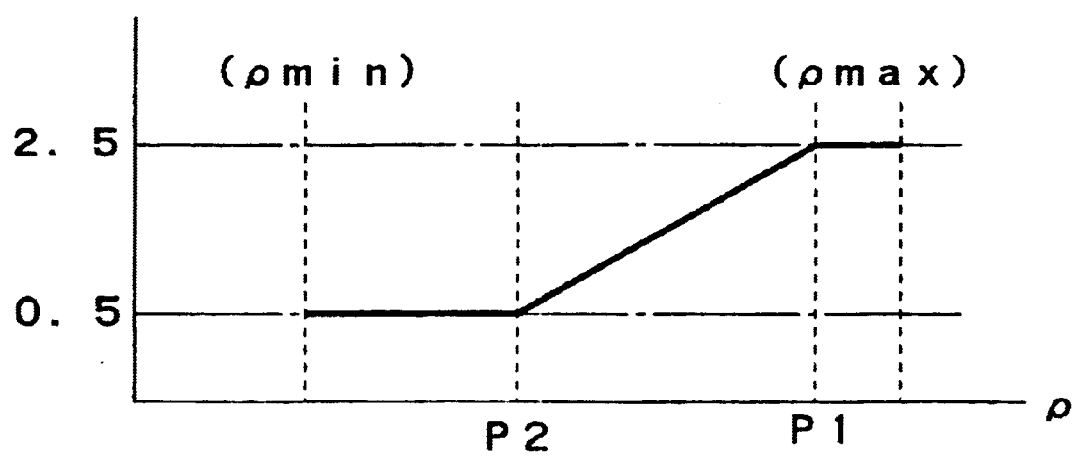
FIG. 8B is an XY graph showing chamfering width of the entire peripheral edge of the spectacle lens.

If the position P1 of the radius vector angle 180° in the lens periphery is assumed to be a radius vector point (a peripheral edge point of the lens shape), a normal line N from the radius vector point corresponds to the very horizontal radius vector line, so a predetermined chamfer width Hmf (Hmr) is inputted along the horizontal radius vector line. For explaining the predetermined chamfer width Hmf (Hmr), small circles a–e with the predetermined chamfer width Hmf (Hmr) as radius are shown in FIG. 8A. For example, the reference chamfer width Hmf (Hmr) is assumed to be 2.5 mm, as shown in FIG. 8B. The position indicated at P1 in FIGS. 8A and 8B represents a chamfer end position after input of the predetermined chamfer width Hmf (Hmr). The value of the chamfer width Hmf (Hmr) is not limited to 2.5 mm. That is, the value of the chamfer width Hmf (Hmr) in the reference chamfer may be set to an arbitrary value by an operator.

As to the other radius vector points, there are set a range in which the chamfer width is varied according to changes in radius vector and a range in which the chamfer width is constant independently of changes in radius vector. More specifically, the radius vector in the horizontal direction already designated generally corresponds to a large radius vector direction in the entire frame. For a portion of a larger radius vector, the chamfer width is set equal to that in the horizontal direction (the constant radius vector range). Further, a chamfer width is designated for a range of smaller radius vectors, e.g., a range of up to 30% of a maximum change quantity with respect the smallest radius vector (maximum value minimum value), i.e., a range from the position of the smallest radius vector $\rho$ min to the position of the radius vector $\rho j$ having the value of the smallest radius vector added by 30% of the maximum change amount.

If it is assumed that a range of radius vectors larger than the horizontal radius vector is 20% of 360 degrees, the remaining radius vectors lie in the range from P1 in FIG. 8B ($\rho$min) to P2 in FIG. 8B ($\rho j$). Chamfer widths for these radius vectors are given as functions of the radius vector values, as shown in FIG. 8B, so as to determine a chamfer width in the normal line direction at each of the radius vector points.

Figure 9:
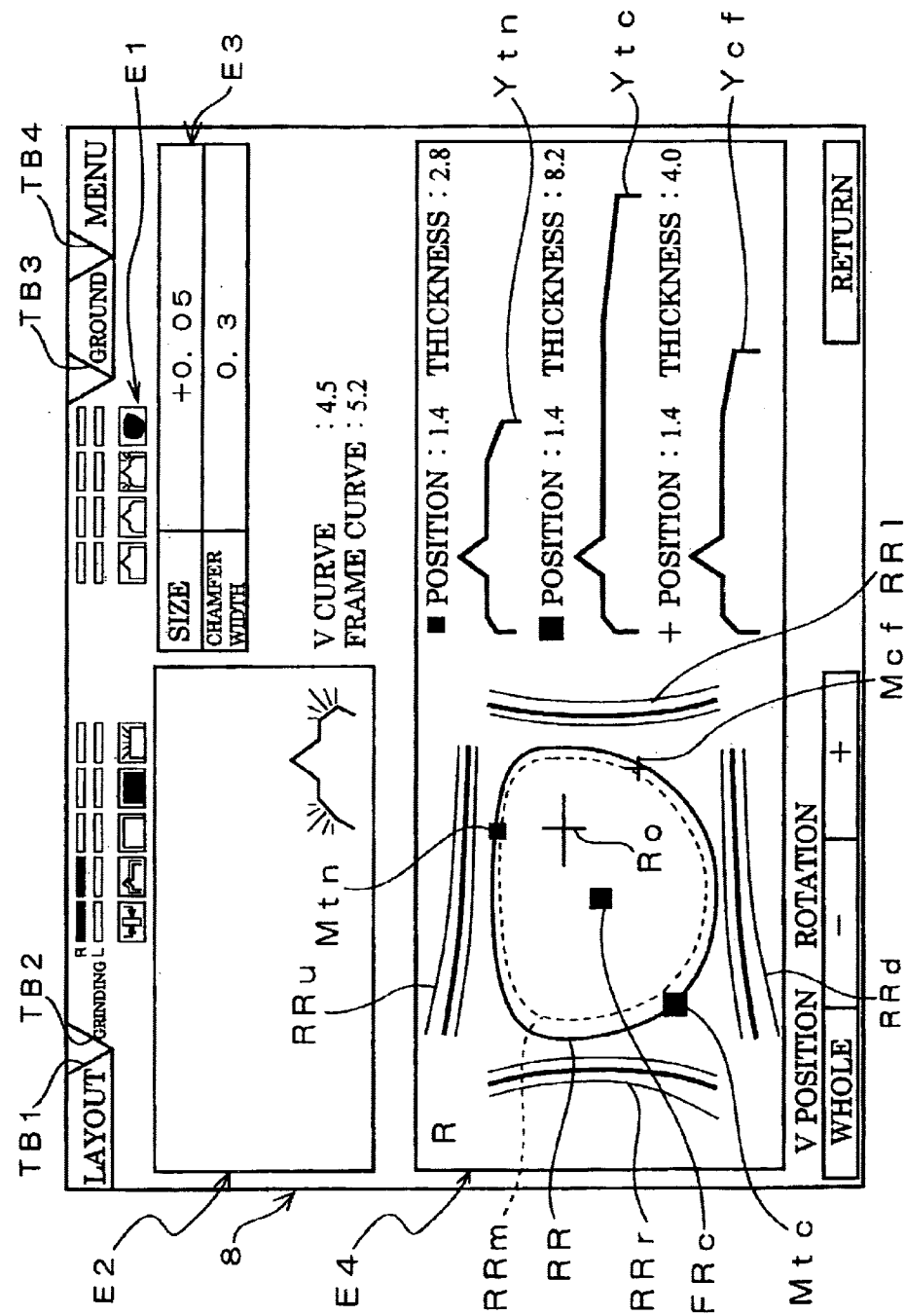
FIG. 9 is a front view of the liquid crystal display unit showing a chamfer locus after edge thickness measurement.

As shown in FIG. 9, the left half of the state display area E4 of the liquid crystal display unit 8 shows a spectacle lens shape RR (or a spectacle frame shape), a chamfer locus shape RRm, a geometrical center mark FRc, an optical center mark Ro, an upper lens width RRu, a lower lens width RRd, a right lens width RRr, a left lens width RR1, a minimum edge thickness position mark Mtn, a maximum edge thickness position mark Mtc, and an edge thickness confirming (arbitrary) position mark Mcf.

The right half of the state display area E4 of the liquid crystal display unit 8 shows a V-shaped protrusion Ytn having a chamfer shape at a position corresponding to the minimum edge thickness position mark Mtn together with its position and edge thickness value, a V-shaped protrusion Ytc having a chamfer shape at a position corresponding to the maximum edge thickness position mark Mtc together with its position and edge thickness value, and a V-shaped protrusion Ycf having a chamfer shape at a position corresponding to the edge thickness confirming (arbitrary) position mark Mcf together with its position and edge thickness value.

The spectacle lens shape RR (or spectacle frame shape) and the chamfer locus shape RRm are respectively indicated by different types of lines (a solid line and a broken line) and in different colors for easy viewing. The glasses shape RR (or spectacle frame shape) and the chamfer locus shape RRm may also be displayed in a three-dimensional representation. Further, it is also possible to change the viewpoint of the three-dimensional representation (from an arbitrarily viewpoint or a predetermined viewpoint).

As to portions to be changed or not to be changed in radius vector on the basis of the range setting and radius vectors described above, no limitation is made to those referred to in the above embodiment.

That is, the radius vectors are divided either into a range where the chamfer widths are set to a constant value or into a range where the chamfer widths are determined according to the radius vectors, thereby defining the chamfer loci.

As an idea of defining a chamfer width in a particular range instead of the aforementioned method wherein a chamfer width in a normal line direction of a radius vector is defined for a change in the radius vector, it is also possible to convert the radius vector information into XY coordinates. For example, an edge width changing linearly depending on its value is given in a horizontal direction (X) while a constant value independent of the radius vector value is given in a vertical direction (Y), and the XY coordinate values thus obtained are converted into a polar coordinate system.

Moreover, the chamfer locus information thus obtained can be used as a guideline for specifying a chamfer width in the horizontal direction by matching the lens shape data (frame shape) with its reference position.

The shape of a lens refraction plane is measured on the basis of chamfer locus data obtained and the data thus obtained can be used to obtain axial control data during chamfering.

It is also possible to calculate axial-direction data on the chamfer locus by using the lens refraction plane shape data obtained beforehand for V-shape grinding for example.

By using the chamfer locus thus obtained, predetermined ρ data, and reference grinding position data of the chamfering wheel, ρ L conversion is performed to obtain corresponding shaft-to-shaft distance control data.

Next, the present invention will be described below as a whole, including the relation thereof to the prior art.

Heretofore, a cutting point locus prepared by a chamfering wheel on a chamfer edge surface side has been determined. This is based on the way of thinking that grinding data prepared in the conventional V grinding and flat grinding are utilized as they are (or a mere replacement of data on the grinding wheel diameter) as edge surface shape data, and data for chamfering are newly obtained only with respect to control in the lens optical axis direction.

According to such a conventional way of thinking, if the chamfer width is variable, the shape as seen from a refraction plane side cannot be specified because the cutting point locus is determined from the edge surface side.

On the other hand, in the present invention, all the reference points are seen not from the edge surface side but from a refraction plane side, and with a cutting point prepared by the chamfering wheel on the refraction plane side is used as a reference point and the locus thereof is specified first. This is a great feature of the present invention.

Also in point of grinding control, on the basis of data of a chamfering wheel cutting point locus on a refraction plane side ($\theta j$, $\rho j$) [j =0, 1, 2, 3, . . . m] there are obtained shaft-to-shaft distance control data between the wheel shaft and the lens shaft.

Figure 10:
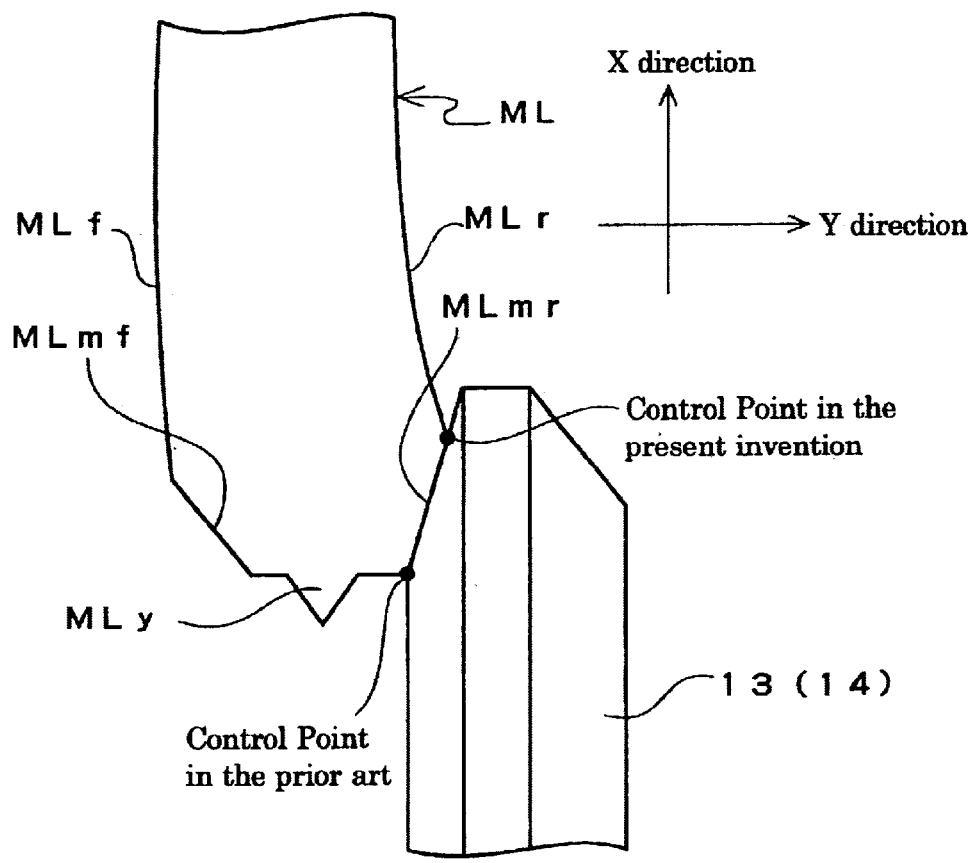
FIG. 10 is an explanatory diagram for explaining a difference between a reference control point in the present invention and that in the prior art.
Figure 11:
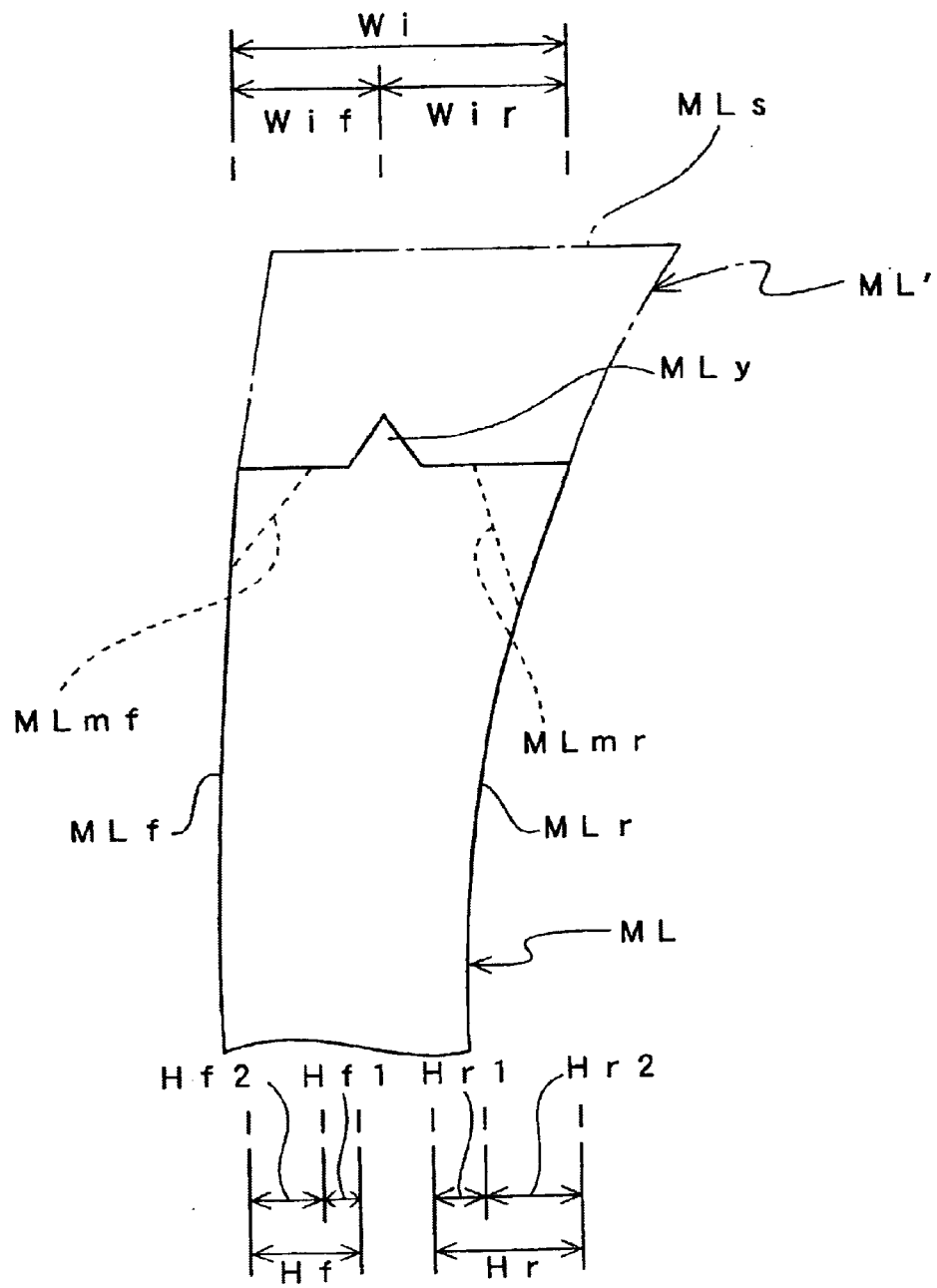
FIG. 11 is an explanatory diagram for explaining a conventional spectacle lens chamfering method.

There is obtained such a reference control point as shown in FIG. 10, with no change on the wheel (Y-axis direction in the apparatus). According to the conventional way of thinking, a related position is shown in FIG. 10 and actually chamfering is performed by control in Y direction, so a cut-in state in X direction cannot be judged, nor is it possible to judge whether the wheel grinding surface is sufficient or not.

Further, in the case of a small frame shape, it has so far been impossible to fully grasp a machining interference between the lens shaft and the wheel.

In the present invention, in view of the above-mentioned points, the grinding work is controlled without using the conventional edge surface side as a reference position for control, but using a cutting point on a refraction plane side as a reference position, whereby shaft-to-shaft distance control data between the wheel shaft and the lens shaft can be obtained on the basis of data of a chamfering wheel cutting point locus ($\theta j$, $\rho j$) on a refraction plane side. Thus, a cut-in quantity in a direction (Y direction) orthogonal to the spectacle lens optical axis and whether a sufficient grinding surface of the chamfering wheel is present or not, which have so far been unable to be grasped, can be judged easily and it is also possible to fully grasp a machining interference between the lens shaft and the wheel.

In the spectacle lens chamfering data preparing method and apparatus and the chamfering method and apparatus according to the present invention, as set forth above, a series of chamfering operations based mainly on the edge surface side are reviewed as a whole and it is possible to effect a chamfering work while seeing a spectacle lens from a front or rear refraction plane side, pursue a chamfer locus which fits the taste of the person who wears the glasses, collect edge thickness shape data along a chamfer locus on a refraction plane, and realize a chamfering work based on those data. Thus, not only it becomes possible to make a control in accordance with a certain method independently of a change in chamfer width, but also the designation of a chamfer width can be done easily.

The present invention provides a spectacle lens chamfering data creation method comprising steps of: entering spectacle frame lens shape information and a predetermined chamfer width; and calculating a chamfer locus on a refraction plane of a spectacle lens having the lens shape obtained by using the lens shape information.

According to another aspect of the present invention, the spectacle lens chamfering data creation method comprises steps of: entering spectacle frame lens shape information and a predetermined chamfer width; and obtaining data on a lens edge/shape along a chamfer locus on a refraction plane of a spectacle lens having the lens shape obtained by using the lens shape information.

According to still another aspect of the present invention, the spectacle lens chamfering data creation method comprising steps of: entering spectacle frame lens shape information and a reference chamfer width at a radius vector at a predetermined angle of the lens shape information; entering a minimum chamfer width at a radius vector at another angle of the lens shape information; and obtaining a chamfer locus on a refraction plane of a spectacle lens by using a position of the reference chamfer as one reference and a position of the minimum chamfer as another reference.

According to yet another aspect of the present invention, the spectacle lens chamfering data creation method comprises steps of: entering spectacle frame lens shape information and a reference chamfer width at a radius vector at a predetermined angle of the lens shape information; entering a minimum chamfer width at a radius vector at another angle of the lens shape information; obtaining a chamfer locus on a refraction plane of a spectacle lens by using a position of the reference chamfer as one reference and a position of the minimum chamfer as another reference; and obtaining data on a spectacle lens edge thickness/shape along the chamfer locus.

According to yet still another aspect of the present invention, chamfer width values at several points of the spectacle lens shape (periphery) are entered to obtain the chamfer locus according to the chamfer width values at the respective points.

According to still yet another aspect of the present invention, the spectacle lens chamfering method comprises steps of obtaining a chamfer locus by using the aforementioned spectacle lens chamfering data creation method; calculating a spectacle lens edge thickness along the obtained chamfer locus; and performing chamfering.

In one aspect of the apparatus for preparing spectacle lens chamfering data according to the present invention, the apparatus comprises a lens shape data input means for inputting lens shape data of a spectacle frame, a chamfer width input means for inputting a predetermined chamfer width from a peripheral edge of the inputted lens shape, and a computing means for determining a chamfer locus on a refraction plane of a spectacle lens from the inputted chamfer width.

In another aspect of the apparatus for preparing spectacle lens chamfering data, the apparatus comprises a lens shape data input means for inputting lens shape data of a spectacle frame, a chamfer width input means for inputting a predetermined chamfer width from a peripheral edge of the inputted lens shape, a computing means for determining a chamfer locus on a refraction plane of a spectacle lens from the inputted chamfer width, and an edge thickness shape data input means for inputting edge thickness shape data of the spectacle lens along the chamfer locus thus determined.

In a further aspect of the apparatus for preparing spectacle lens chamfering data, the apparatus comprises a lens shape data input means for inputting lens shape data of a spectacle frame, a chamfer width input means for inputting a chamfer width of a reference chamfer from a first peripheral edge of the inputted lens shape and inputting a chamfer width of a minimum chamfer from a second peripheral edge of the lens shape in another meridian direction, and a computing means for determining a chamfer locus on a refraction plane of a spectacle lens with a chamfer end position of the reference chamfer and that of the minimum chamfer as a reference.

In a still further aspect of the apparatus for preparing spectacle lens chamfering data, the apparatus comprises a lens shape data input means for inputting lens shape data of a spectacle frame, a chamfer width input means for inputting a chamfer width of a reference chamfer from a first peripheral edge of the inputted lens shape and inputting a chamfer width of a minimum chamfer from a second peripheral edge of the lens shape in another meridian direction, a computing means for determining a chamfer locus on a refraction plane of a spectacle lens with a chamfer end position of the reference chamfer and that of the minimum chamfer as a reference, and an edge thickness shape data input means for inputting edge thickness shape data of the spectacle lens along the chamfer locus.

In a still further aspect of the apparatus for preparing spectacle lens chamfering data, in combination with any of the above apparatus, the chamfer width input means inputs a chamfer width in a normal line direction from each of peripheral edge points of the lens shape of the spectacle frame, and the computing means determines a chamfer locus with a chamfer end position at each of the peripheral edge points as a reference.

Further, in one aspect of the apparatus for chamfering a spectacle lens according to the present invention, the apparatus comprises a chamfering wheel for chamfering a spectacle lens on the basis of edge thickness shape data of the spectacle lens obtained along a chamfer locus, the chamfer locus being obtained using any of the above spectacle lens chamfering data preparing apparatuses.

What is claimed is:

1. A spectacle lens chamfering data creation method comprising steps of:
   entering spectacle frame lens shape information and a predetermined chamfer width; and
   calculating a chamfer locus on a refraction plane of a spectacle lens having the lens shape obtained by using the lens shape information.

2. The spectacle lens chamfering data creation method as claimed in claim 1, wherein chamfer width values at several points of the spectacle lens shape (periphery) are entered to obtain the chamfer locus according to the chamfer width values at the respective points.

3. A spectacle lens chamfering method comprising steps of:
   obtaining a chamfer locus by using the spectacle lens chamfering data creation method claimed in claim 2;
   calculating a spectacle lens edge thickness along the obtained chamfer locus; and performing chamfering.

4. A spectacle lens chamfering method comprising steps of:
   obtaining a chamfer locus by using the spectacle lens chamfering data creation method claimed in claim 1;
   calculating a spectacle lens edge thickness along the obtained chamfer locus; and
   performing chamfering.

5. A spectacle lens chamfering data creation method comprising steps of:
   entering spectacle frame lens shape information and a predetermined chamfer width; and
   obtaining data on a lens edge/shape along a chamfer locus ion a refraction plane of a spectacle lens having the lens shape obtained by using the lens shape information.

6. The spectacle lens chamfering data creation method as claimed in claim 5, wherein chamfer width values at several points of the spectacle lens shape (periphery) are entered to obtain the chamfer locus according to the chamfer width values at the respective points.

7. A spectacle lens chamfering method comprising steps of:
   obtaining a chamfer locus by using the spectacle lens chamfering data creation method claimed in claim 5;
   calculating a spectacle lens edge thickness along the obtained chamfer locus; and performing chamfering.

8. A spectacle lens chamfering data creation method comprising steps of:
- entering spectacle frame lens shape information and a reference chamfer width at a radius vector at a predetermined angle of the lens shape information;
- entering a minimum chamfer width at a radius vector at another angle of the lens shape information; and
- obtaining a chamfer locus on a refraction plane of a spectacle lens by using a position of the reference chamfer as one reference and a position of the minimum chamfer as another reference.

9. The spectacle lens chamfering data creation method as claimed in claim 8, wherein chamfer width values at several points of the spectacle lens shape (periphery) are entered to obtain the chamfer locus according to the chamfer width values at the respective points.

10. A spectacle lens chamfering method comprising steps of:
- obtaining a chamfer locus by using the spectacle lens chamfering data creation method claimed in claim 8;
- calculating a spectacle lens edge thickness along the obtained chamfer locus; and
- performing chamfering.

11. A spectacle lens chamfering data creation method comprising steps of:
- entering spectacle frame lens shape information and a reference chamfer width at a radius vector at a predetermined angle of the lens shape information;
- entering a minimum chamfer width at a radius vector at another angle of the lens shape information;
- obtaining a chamfer locus on a refraction plane of a spectacle lens by using a position of the reference chamfer as one reference and a position of the minimum chamfer as another reference; and
- obtaining data on a spectacle lens edge thickness/shape along the chamfer locus.

12. The spectacle lens chamfering data creation method as claimed in claim 11, wherein chamfer width values at several points of the spectacle lens shape (periphery) are entered to obtain the chamfer locus according to the chanter width values at the respective points.

13. A spectacle lens chamfering method comprising steps of:
- obtaining a chamfer locus by using the spectacle lens chamfering data creation method claimed in claim 11;
- calculating a spectacle lens edge thickness along the obtained chamfer locus; and
- performing chamfering.

14. An apparatus for preparing spectacle lens chamfering data, the apparatus comprising a lens shape measuring apparatus for inputting lens shape data of a spectacle frame, an operation panel for inputting a predetermined chamfer width from a peripheral edge of the inputted lens shape, and a computing means for determining a chamfer locus on a refraction plane of a spectacle lens from the inputted chamfer width.

15. An apparatus for preparing spectacle lens chamfering data as claimed in claim 14, wherein said operation panel inputs a chamfer width in a normal line direction from each of peripheral edge points of the lens shape of the spectacle frame, and said computing means determines a chamfer locus with a chamfer end position at each of the peripheral edge points as a reference.

16. An apparatus for chamfering a spectacle lens, the apparatus comprising a chamfering wheel for chamfering a spectacle lens on the basis of edge thickness shape data of the spectacle lens obtained along a chamfer locus, said chamfer locus being obtained using the spectacle lens chamfering data preparing apparatus as claimed in claim 15.

17. An apparatus for chamfering a spectacle lens, the apparatus comprising a chamfering wheel for chamfering a spectacle lens on the basis of edge thickness shape data of the spectacle lens obtained along a chamfer locus, said chamfer locus being obtained using the spectacle lens chamfering data preparing apparatus as claimed in claim 14.

18. An apparatus for preparing spectacle lens chamfering data, the apparatus comprising a lens shape measuring apparatus for inputting lens shape data of a spectacle frame, an operation panel for inputting a predetermined chamfer width from a peripheral edge of the inputted lens shape, a computing means for determining a chamfer locus on a refraction plane of a spectacle lens from the inputted chamfer width, and a feeler for measuring edge thickness shape data of the spectacle lens along the chamfer locus thus determined.

19. An apparatus for preparing spectacle lens chamfering data as claimed in claim 18, wherein said operation panel inputs a chamfer width in a normal line direction from each of peripheral edge points of the lens shape of the spectacle frame, and said computing means determines a chamfer locus with a chamfer end position at each of the peripheral edge points as a reference.

20. An apparatus for chamfering a spectacle lens, the apparatus comprising a chamfering wheel for chamfering a spectacle lens on the basis of edge thickness shape data of the spectacle lens obtained along a chamfer locus, said chamfer locus being obtained using the spectacle lens chamfering data preparing apparatus as claimed in claim 19.

21. An apparatus for chamfering a spectacle lens, the apparatus comprising a chamfering wheel for chamfering a spectacle lens on the basis of edge thickness shape data of the spectacle lens obtained along a chamfer locus, said chamfer locus being obtained using the spectacle lens chamfering data preparing apparatus as claimed in claim 18.

22. An apparatus for preparing spectacle lens chamfering data, the apparatus comprising a lens shape measuring apparatus for inputting lens shape data of a spectacle lens, an operation panel for inputting a chamfer width of a reference chamfer from a first peripheral edge of the inputted lens shape and inputting a chamfer width of a minimum chamfer from a second peripheral edge of the lens shape in another meridian direction, and a computing means for determining a chamfer locus on a refraction plane of a spectacle lens with a chamfer end position of said reference chamfer and that of said minimum chamfer as a reference.

23. An apparatus for preparing spectacle lens chamfering data as claimed in claim 22, wherein said operation panel inputs a chamfer width in a normal line direction from each of peripheral edge points of the lens shape of the spectacle frame, and said computing means determines a chamfer locus with a chamfer end position at each of the peripheral edge points as a reference.

24. An apparatus for chamfering a spectacle lens, the apparatus comprising a chamfering wheel for chamfering a spectacle lens on the basis of edge thickness shape data of the spectacle lens obtained along a chamfer locus, said chamfer locus being obtained using the spectacle lens chamfering data preparing apparatus as claimed in claim 23.

25. An apparatus for chamfering a spectacle lens, the apparatus comprising a chamfering wheel for chamfering a spectacle lens on the basis of edge thickness shape data of the spectacle lens obtained along a chamfer locus, said chamfer locus being obtained using the spectacle lens chamfering data preparing apparatus as claimed in claim 22.

26. An apparatus for preparing spectacle lens chamfering data, the apparatus comprising a lens shape measuring apparatus for inputting lens shape data of a spectacle frame, an operation panel for inputting a chamfer width of a reference chamfer from a first peripheral edge of the inputted lens shape and inputting a chamfer width of a minimum chamfer from a second peripheral edge of the lens shape in another meridian direction, a computing means for determining a chamfer locus on a refraction plane of a spectacle lens with a chamfer end position of said reference chamfer and that of said minimum chamfer as a reference, and a feeler for measuring edge thickness shape data of the spectacle lens along said chamfer locus.

27. An apparatus for preparing spectacle lens chamfering data as claimed in claim 26, wherein said operation panel inputs a chamfer width in a normal line direction from each of peripheral edge points of the lens shape of the spectacle frame, and said computing means determines a chamfer locus with a chamfer end position at each of the peripheral edge points as a reference.

28. An apparatus for chamfering a spectacle lens, the apparatus comprising a chamfering wheel for chamfering a spectacle lens on the basis of edge thickness shape data of the spectacle lens obtained along a chamfer locus, said chamfer locus being obtained using the spectacle lens chamfering data preparing apparatus as claimed in claim 21.

29. An apparatus for chamfering a spectacle lens, the apparatus comprising a chamfering wheel for chamfering a spectacle lens on the basis of edge thickness shape data of the spectacle lens obtained along a chamfer locus, said chamfer locus being obtained using the spectacle lens chamfering data preparing apparatus as claimed in claim 26.

* * * * *

UNITED STATES PATENT AND TRADEMARK OFFICE
CERTIFICATE OF CORRECTION

PATENT NO.    : 6,688,944 B2
DATED         : February 10, 2004
INVENTOR(S)   : Hatano et al.

It is certified that error appears in the above-identified patent and that said Letters Patent is hereby corrected as shown below:

<u>Title page,</u>
After Item [65], Prior Publication Data, insert the following:

[30]         Foreign Application Priority Data

October 17, 2000      (JP) …………………….. 2000-317055 --

Signed and Sealed this

Twenty-fourth Day of August, 2004

JON W. DUDAS
*Director of the United States Patent and Trademark Office*